UNITED STATES PATENT OFFICE.

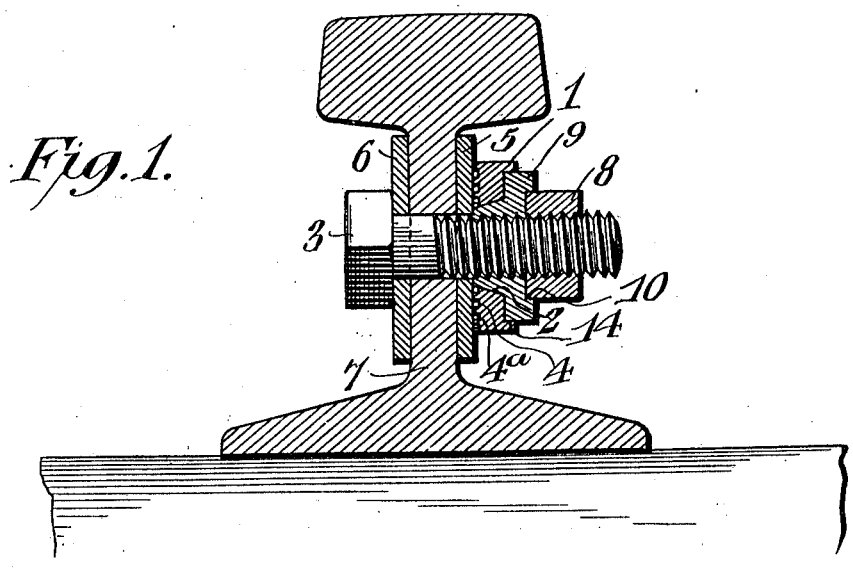

GEORGE J. FORREY, OF CARLISLE, PENNSYLVANIA, ASSIGNOR OF ONE-HALF TO SAMUEL L. DIVEN, OF CARLISLE, PENNSYLVANIA.

NUT-LOCK.

955,784. Specification of Letters Patent. Patented Apr. 19, 1910.

Application filed May 20, 1909. Serial No. 497,237.

*To all whom it may concern:*

Be it known that I, GEORGE J. FORREY, a citizen of the United States, residing at Carlisle, in the county of Cumberland and State of Pennsylvania, have invented a new and useful Nut-Lock, of which the following is a specification.

The invention relates to improvements in nut locks.

The object of the present invention is to improve the construction of nut locks, and to provide a simple, inexpensive and efficient one, designed for use on rail joints, machines and various other constructions subject to vibration, and adapted to be applied to an ordinary bolt and nut without necessitating any alteration in the construction thereof, and capable of securely locking a bolt and nut against rotary movement.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a transverse sectional view of a rail joint having a bolt provided with a nut lock, constructed in accordance with this invention. Figs. 2 and 3 are detail perspective views, illustrating the construction of the base plate or washer. Figs. 4 and 5 are similar views of the locking member.

Like numerals of reference designate corresponding parts in all the figures of the drawing.

1 designates a base plate or washer having a central inwardly tapered opening 2 for the passage of a bolt 3, and provided with an inner roughened face 4, adapted to engage a fish plate 5, or other surface for preventing rotary movement of the plate or washer. The inner engaging face 4 is preferably roughened by grooves 4ª crossing the plate or washer at right angles, but the said plate or member may be equipped with any other suitable means for engaging it with the surface against which it is placed, or it may be constructed of polygonal shape for engaging an adjacent part to hold it against rotary movement when the nature of the construction will admit of the use of a plate or washer of such shape. The bolt, which passes through registering openings of the fish plates 5 and 6 and a rail 7, is provided at one end with a head, which engages one of the fish plates. The threaded portion of the bolt receives a nut 8 and a locking member 9, having threads for engaging the threaded portion of the bolt. The nut, which is of the ordinary construction may be hexagonal, square, or any other polygonal shape, and the locking member, which is circular, is provided in its outer face with a recess 10, conforming to the configuration of and receiving the inner portion of the nut 8, whereby the nut 8 and the locking member 9 are interlocked and held against independent rotary movement.

The locking member 9 is provided with a central bolt opening and has interior screw threads 11, and is also provided at its inner face with an integral tapered or conical clamping portion 12, split longitudinally at opposite points at 13 and adapted to fit into the tapered opening 2 of the plate or washer 1, whereby when the nut and the locking member are screwed inward on the bolt, the split conical portion 12 will be wedged within the plate or washer 1 and will be caused to firmly clamp the bolt for locking the member 9 and the nut 8 against rotary movement. The plate or washer 1 is provided at its outer face with a circular recess 14 in which the circular locking member 9 fits when the parts are assembled, as illustrated in Fig. 1 of the drawing.

The device is easily applied and may readily be removed without injuring the bolt or nut, and it is adapted to lessen the labor of trackmen, as bolts equipped with the locking device will not require the attention of the ordinary bolt not provided with locking means.

Having thus fully described my invention, what I claim as new and desire to secure by Letters Patent, is:—

1. A nut lock including a base plate or washer and having a tapered opening, said base plate or washer being also provided at its outer face with a circular recess, and a circular interior threaded locking member fitted in the circular recess of the base plate or washer and provided at its inner face with a conical extension fitting in the tapered opening of the base plate or washer and split longitudinally and adapted to be forced into engagement with a bolt by the said base plate or washer when a nut is screwed inward against the locking member.

2. A nut lock including a base plate or washer provided with an inner roughened engaging face and having a tapered opening, an interiorly threaded locking member provided in its outer face with a polygonal nut-receiving recess and having a conical extension at its inner face fitting in the tapered opening of the base plate or washer and split longitudinally and adapted to be forced into engagement with the bolt by the base plate or washer when a nut is screwed inward against the locking member.

3. A nut lock including a base plate or washer provided with an inner roughened engaging face and having a tapered opening, said base plate or washer being also provided at its outer face with a circular recess, and a circular interiorly threaded locking member fitted in the circular recess of the base plate or washer and provided in its outer face with a polygonal nut-receiving recess, said locking member being also provided at its inner face with a conical extension fitting in the tapered opening of the base plate or washer and split longitudinally and adapted to be forced into engagement with a bolt by the base plate or washer.

In testimony that I claim the foregoing as my own, I have hereto affixed my signature in the presence of two witnesses.

GEORGE J. FORREY.

Witnesses:
C. M. LIGGETT,
D. D. DAY.